May 20, 1930.  H. N. BERRY  1,759,086
COTTON PICKER
Filed Nov. 28, 1927
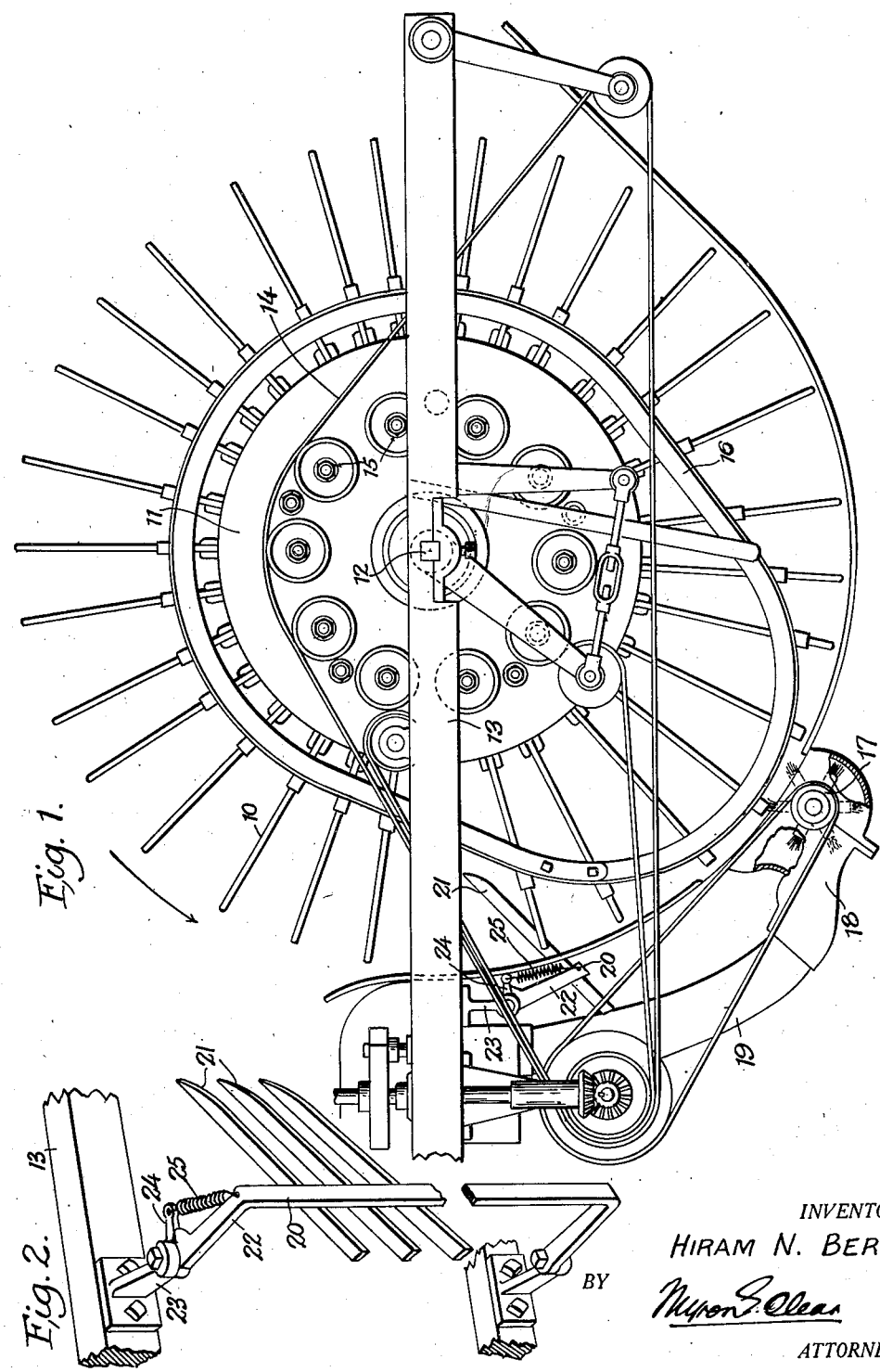
INVENTOR.
HIRAM N. BERRY
BY
ATTORNEY.

Patented May 20, 1930

1,759,086

UNITED STATES PATENT OFFICE

HIRAM N. BERRY, OF GREENVILLE, MISSISSIPPI, ASSIGNOR, BY DIRECT AND MESNE ASSIGNMENTS, TO COTTON HARVESTER CORPORATION OF AMERICA, OF GREENVILLE, MISSISSIPPI, A CORPORATION OF DELAWARE

COTTON PICKER

Application filed November 28, 1927. Serial No. 236,228.

My present invention relates generally to cotton pickers of the rotating spindle type, and more especially to one in which the spindles rotate in vertical and horizontal rows and radiate from spaced apart revolving cylinders. In such apparatus the picking is accomplished in the space between the cylinders and the cotton is removed from the spindles at the outer portions of the cylinders by a suitable doffing mechanism.

It frequently happens that broken stalks and branches of dry plants are carried around the cylinders with the spindles and since such foreign matter or débris interferes materially with the proper action of the doffing mechanism, I have before proposed the use of a comb at the rear of each cylinder with teeth extending at an angle toward the cylinder and between the horizontal rows of spindles. The purpose is to intercept broken stalks, branches and the like and deflect the same beyond the ends of the spindles for discharge before reaching the doffing mechanism. Such an arrangement, while effective, gives rise to considerable danger of breaking the spindles when a heavy stalk is wedged among the spindles, since the comb obviously forms a rigid abutment.

For the above reason, my invention seeks to improve the arrangement and render the same more safe by the provision of a comb which may yield under excessive pressure or resistance of heavy wedged stalks or other foreign matter and will be automatically returned, and normally held, in proper effective position.

In the accompanying drawing, which illustrates my present invention, and forms a part of this specification, Figure 1 is a plan view of a portion of a cotton picker, illustrating the practical application of my present improvement, and, Figure 2 is a detail perspective view of the yieldable comb forming my invention.

Referring now to these figures, and particularly to Figure 1, I have shown certain parts of a cotton picker of the rotating spindle type, the spindles 10, radially outstanding from cylinders of which one is seen at 11. The cylinder 11, revolves about a vertical axis 12, supported in a suitable frame which, in practice, is wheeled, and which includes a pair of frame bars 13, one above and the other below, the cylinder 11.

The spindles 10, are driven or rotated upon their own axes, by connections including a belt 14, with which pulleys 15, contact at one side of the cylinder where the spindles pass into and out of the cotton plants during the picking operation. The cylinder revolves with its multitude of spindles, in the direction of the arrow. After passing out of the cotton plants and in the further revolution of the cylinder, the spindles successively come to the doffing station, where the cotton is removed from the cylinder, after having been shifted to the ends of the spindles by means of a stripping mechanism including apertured stripping bars, one for each vertical row of spindles. These stripping bars are shifted inwardly and outwardly along the spindles by guide means consisting of eccentric tracks, of which one is seen at 16.

The doffing mechanism preferably includes a barbed vertical roller 17, which removes the cotton from the spindles 10, adjacent to a suction mouth 18, the cotton being then conveyed to a desired holder through a suction tube 19.

In the picking operation, dried plants are frequently encountered and frequently broken, and if carried around with the spindles as far as the doffing mechanism, the machine often becomes clogged and must be stopped and manually cleaned. To avoid this I have already proposed a comb arranged vertically at the rear of each cylinder with its teeth extending inwardly toward the cylinder and angled toward its inner side so that any broken stalks or branches will be engaged by the comb teeth and will slide thereon beyond the ends of the spindles, and in this way discharged. In some instances however, the stalks are too heavy to be thus discharged and it is obvious that with a rigid comb and a rotating series of spindles, such instances give rise to great danger of breaking the spindles.

Accordingly my invention proposes a comb which is yieldable and for this purpose the comb 20, clearly shown in Figure 2, consists of a vertical bar with horizontal teeth 21, and with angular end extentions 22, the latter of which are pivotally connected to the outstanding supporting brackets 23. These brackets 23, may be connected to any suitable part of the supporting frame of the cotton picker, as for instance the frame bars 13, before mentioned. Moreover the brackets 23, have at their outer ends, angular lugs 24, to which are anchored controlling springs 25. These springs 25, are connected to the ends of the comb 20, so as to normally hold the latter in operative position with its teeth 21, extending at the desired angle between the horizontal rows of spindles 10. In this position each comb engages portions of its upper bracket 23, as shown in Fig. 2, so as to limit its inward movement, the tension of springs 25, being such as to prevent yielding of the comb except under such pressure or resistance of stalks, branches or other foreign matter as would endanger breakage of the spindles.

It is obvious that when the comb has yielded under such pressure, and the resisting matter has passed thereby, the springs 25, will return the comb to normal active position as shown in Figure 1, and that while it may, and probably will, be necessary to manually remove the resisting matter, breakage of spindles and delays due to necessary replacements thereof, will be avoided.

It is also obvious that the arc of movement of the comb in yielding beyond the ends of the spindles must be entirely beyond the plane of movement of the stripping bars before referred to, such plane being determined by the shape of the eccentric tracks 16. Otherwise the particular manner of mounting the comb so as to accomplish the purposes of my invention, may be considerably varied, and my invention is not to be understood as limited to the particular mounting herein shown and described.

Having thus fully described my invention, I claim,

1. In a cotton picker, a revolving cylinder, rotating spindles radiating from said cylinder and arranged in horizontal rows, and a comb having teeth normally extending at an angle into the spindles between the rows thereof, said comb being yieldable on its support for movement toward and away from the cylinder.

2. In a cotton picker, a revolving cylinder, rotating spindles radiating from said cylinder and arranged in horizontal rows, and a movably mounted comb having teeth shiftable with the comb into and out of the spaces between said rows of spindles.

3. In a cotton picker, a revolving cylinder, rotating spindles radiating from said cylinder and arranged in horizontal rows, and a pivotally supported comb having a controlling spring and having teeth shiftable with the comb into and out of the spaces between said rows of spindles.

4. In a cotton picker, a revolving cylinder, rotating spindles radiating from said cylinder and arranged in horizontal rows, a comb having teeth normally extending into the spaces between the rows of spindles, brackets upon which said comb is pivoted, and springs arranged to move the comb toward the cylinder and to permit the same to yield away from the cylinder.

5. In a cotton picker, a revolving cylinder, rotating spindles radiating from said cylinder and arranged in horizontal rows, a comb having teeth normally extending into the spaces between the rows of spindles, brackets upon which said comb is pivoted, and springs arranged to move the comb toward the cylinder and to permit the same to yield away from the cylinder, said brackets acting to limit movement of the comb toward the cylinder.

6. In a cotton picker, a revolving cylinder, rotating spindles radiating from said cylinder and arranged in horizontal rows, a comb consisting of an upright bar having a series of vertically spaced teeth extending between the rows of spindles, and having angular extensions at the ends thereof, supports to which said extensions are pivoted, spring means engaging the supports and comb and tensioned to move the latter toward the cylinder, said supports acting to limit such movement of the comb.

7. In a cotton picker, a revolving cylinder, rotating spindles radiating from said cylinder and arranged in horizontal rows, a comb consisting of an upright bar having a series of vertically spaced teeth extending between the rows of spindles, said comb having angular extensions at the ends thereof, supports to which said extensions are pivoted, spring means engaging the supports and comb and tensioned to move the latter toward the cylinder, said extensions engaging said supports to limit such movement of said comb.

In testimony whereof I affix my signature.

HIRAM N. BERRY.